(12) United States Patent (10) Patent No.: US 12,687,996 B2

Arakawa (45) Date of Patent: Jul. 21, 2026

---

(54) IMAGE PROCESSING APPARATUS, CONTROL METHOD AND STORAGE MEDIUM

(71) Applicant: CANON KABUSHIKI KAISHA, Tokyo (JP)

(72) Inventor: Ryoji Arakawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 18/512,955

(22) Filed: Nov. 17, 2023

(65) Prior Publication Data

US 2024/0171696 A1    May 23, 2024

(30) Foreign Application Priority Data

Nov. 22, 2022    (JP) ................................. 2022-186608

(51) Int. Cl.
| | |
|---|---|
| *G06F 3/14* | (2006.01) |
| *H04N 1/00* | (2006.01) |
| *H04N 1/60* | (2006.01) |
| *H04N 101/00* | (2006.01) |

(52) U.S. Cl.
CPC ....... *G06F 3/1407* (2013.01); *H04N 1/00129* (2013.01); *H04N 1/0044* (2013.01); *H04N 1/00503* (2013.01); *H04N 1/6088* (2013.01); *H04N 2101/00* (2013.01); *H04N 2201/0084* (2013.01)

(58) Field of Classification Search
CPC ............. H04N 1/00129; H04N 1/0044; H04N 1/00503; H04N 1/6088; H04N 5/268;

H04N 2101/00; H04N 2201/0084; G09G 2320/06; G09G 2320/0673; G09G 5/006; G09G 5/12; G06F 3/1407
See application file for complete search history.

(56) References Cited

U.S. PATENT DOCUMENTS

| | | | | |
|---|---|---|---|---|
| 8,917,345 B2 * | 12/2014 | Jang | ................... | H04N 1/00453 |
| | | | | 348/333.12 |
| 10,178,320 B2 * | 1/2019 | Ishii | ................... | H04N 23/6812 |
| 2005/0190280 A1 * | 9/2005 | Haas | ................. | H04N 1/00458 |
| | | | | 715/730 |

(Continued)

FOREIGN PATENT DOCUMENTS

WO         2008/069050 A1     6/2008

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

An image processing apparatus comprises an interface configured to transmit an image that a display is to be caused to display. The apparatus sets a display time corresponding to a length of time that the display is to be caused to display a single image, and controls image transmission to the display via the interface so that a single image is displayed on the display for at least the display time. In a case where a display setting of the display is changed so that the display setting of the display and a characteristic of an image that the display is to be caused to display correspond, The apparatus controls image transmission so that after the change to the display setting in the display is completed, a single image is displayed on the display for at least the display time.

17 Claims, 8 Drawing Sheets

(56)                    References Cited

U.S. PATENT DOCUMENTS

| | | | |
|---|---|---|---|
| 2014/0125555 A1* | 5/2014 | Jang ....................... | H04N 23/62 |
| | | | 345/2.2 |
| 2016/0309093 A1* | 10/2016 | Ishii ....................... | H04N 23/62 |
| 2019/0080435 A1* | 3/2019 | Yamaguchi ............ | G09G 5/005 |
| 2021/0250518 A1* | 8/2021 | Nashizawa .............. | G09G 5/10 |

* cited by examiner

F I G. 4

| IMAGE INFORMATION GAMMA INFORMATION | DISPLAY GAMMA | | |
|---|---|---|---|
| | SDR(γ2.2) | HLG | PQ |
| SDR(γ2.2) | — | SWITCH | SWITCH |
| HLG | SWITCH | — | SWITCH |
| PQ | SWITCH | SWITCH | — |

F I G. 5

| IMAGE INFORMATION RANGE | DISPLAY RANGE | |
|---|---|---|
| | FULL RANGE | VIDEO RANGE |
| FULL RANGE | — | SWITCH |
| VIDEO RANGE | SWITCH | — |

F I G.  8
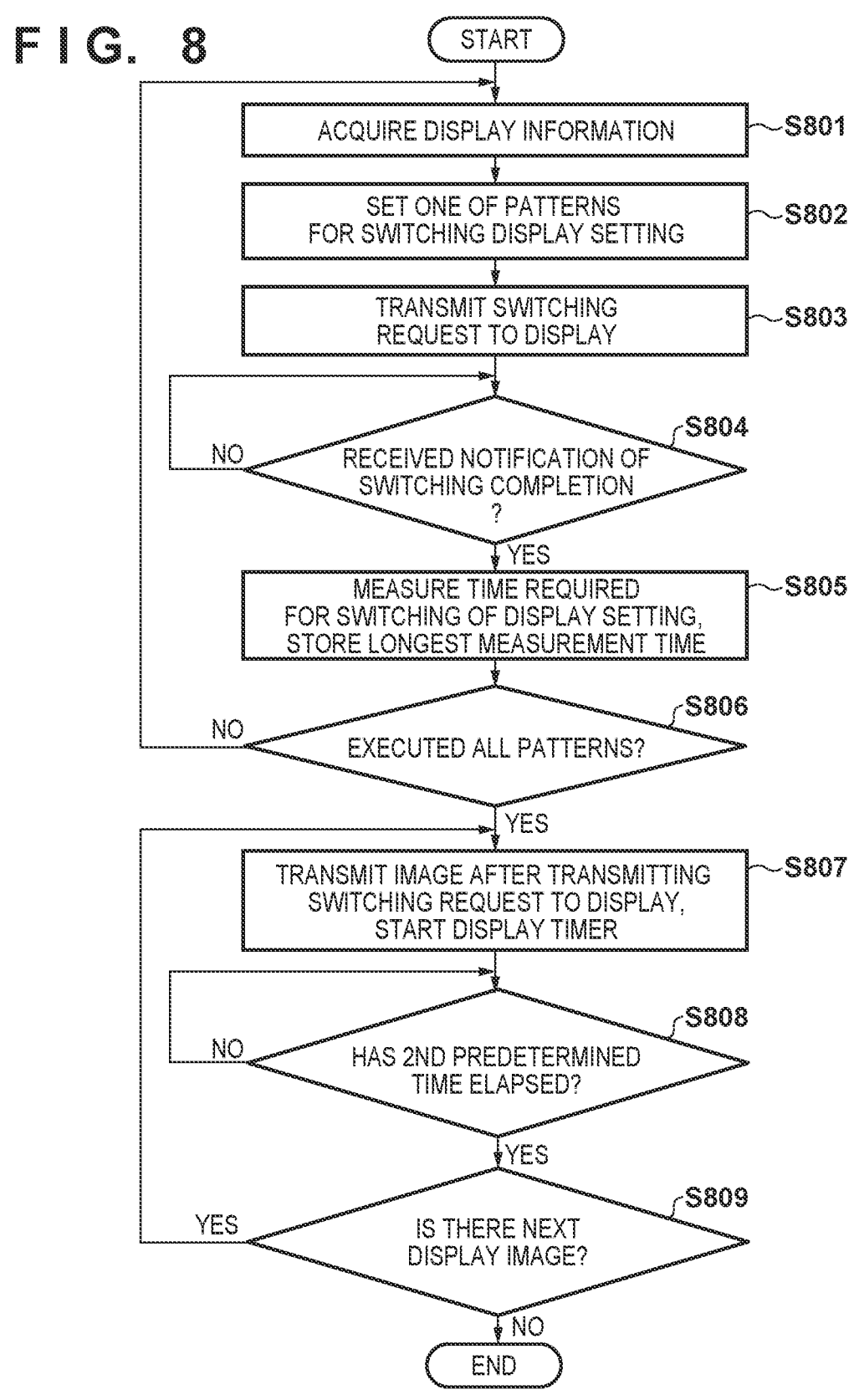

F I G. 9

| IMAGE INFORMATION GAMMA INFORMATION | DISPLAY GAMMA | | |
| --- | --- | --- | --- |
| | SDR(γ2.2) | HLG | PQ |
| SDR(γ2.2) | — | HLG CONVERSION or SWITCH | SWITCH |
| HLG | SDR CONVERSION or SWITCH or AS IS | — | SWITCH |
| PQ | SDR CONVERSION or SWITCH | HLG CONVERSION or SWITCH | — |

F I G. 10

| IMAGE INFORMATION RANGE | DISPLAY RANGE | |
| --- | --- | --- |
| | FULL RANGE | VIDEO RANGE |
| FULL RANGE | — | VIDEO RANGE |
| VIDEO RANGE | SWITCH | VIDEO RANGE CONVERSION |

IMAGE PROCESSING APPARATUS, CONTROL METHOD AND STORAGE MEDIUM

BACKGROUND OF THE INVENTION

Field of the Invention

The present invention relates to an image processing apparatus, a control method, and a storage medium.

Description of the Related Art

Conventionally, a technique in which an electronic device and a display are connected by, for example, High-Definition Multimedia Interface (HDMI), and contents held by the electronic device are outputted to the display are known. When the content is outputted from the electronic device, if there are a plurality of formats of content, the reproduction setting on the display side may be switched according to the format of the content in order to appropriately display the transmitted content. International Publication No. 2008/069050 discloses a technique for reducing the time required for switching between video and audio formats between an input/output device and a playback device in a case where the input/output device is connected to the playback device and the video/audio content is viewed.

Incidentally, in a slideshow function of a digital camera, images to be displayed may be switched periodically. At this time, when the format of the image to be displayed changes, a display setting of the display needs to be switched, but when the display setting of the display is switched, there are cases where the display enters a blackout display state, and an image is displayed after the display setting is switched. That is, when the display setting of the display is switched, the time for displaying the image may become shortened according to the display setting switching time.

SUMMARY OF THE INVENTION

The present invention has been made in view of the above problems, and an object thereof is to realize a technique by which it is possible to display an image at an appropriate display time when switching a display setting for displaying an image in a display.

In order to solve the aforementioned issues, one aspect of the present disclosure provides an image processing apparatus, comprising: an interface configured to transmit an image that a display is to be caused to display; one or more processors; and a memory storing instructions which, when the instructions are executed by the one or more processors, cause the image processing apparatus to function as: a setting unit configured to set a display time corresponding to a length of time that the display is to be caused to display a single image; and a control unit configured to control image transmission to the display via the interface so that a single image is displayed on the display for at least the display time, wherein the control unit, in a case where a display setting of the display is changed so that the display setting of the display and a characteristic of an image that the display is to be caused to display correspond, controls image transmission so that after the change to the display setting in the display is completed, a single image is displayed on the display for at least the display time.

Another aspect of the present disclosure provides a method of controlling an image processing apparatus with an interface for transmitting an image that a display is to be caused to display, the method comprising: setting a display time corresponding to a length of time that the display is to be caused to display a single image; controlling image transmission to the display via the interface so that a single image is displayed on the display for at least the display time, wherein the control includes, in a case where a display setting of the display is changed so that the display setting of the display and a characteristic of an image that the display is to be caused to display correspond, controlling image transmission so that after the change to the display setting in the display is completed, a single image is displayed on the display for at least the display time.

Still another aspect of the present disclosure provides a non-transitory computer-readable storage medium comprising instructions for performing a method of controlling an image processing apparatus with an interface for transmitting an image that a display is to be caused to display, the method comprising: setting a display time corresponding to a length of time that the display is to be caused to display a single image; controlling image transmission to the display via the interface so that a single image is displayed on the display for at least the display time, wherein the control includes, in a case where a display setting of the display is changed so that the display setting of the display and a characteristic of an image that the display is to be caused to display correspond, controlling image transmission so that after the change to the display setting in the display is completed, a single image is displayed on the display for at least the display time.

By virtue of the present invention, it becomes possible to display an image at an appropriate display time when switching a display setting for displaying an image in a display.

Further features of the present invention will become apparent from the following description of exemplary embodiments (with reference to the attached drawings).

BRIEF DESCRIPTION OF THE DRAWINGS

FIG. 4 is a diagram illustrating gamma information conditions for when a display is switched according to the first embodiment.

FIG. 5 is a diagram illustrating range information conditions for when a display is switched according to the first embodiment.

FIG. 8 is a flowchart illustrating a series of operations of a display control process in a digital camera according to the second embodiment.

FIG. 9 is a diagram illustrating gamma information conditions for suppressing a switch by image conversion according to the second embodiment.

FIG. 10 is a diagram illustrating range information conditions for suppressing a switch by image conversion according to the second embodiment.

DESCRIPTION OF THE EMBODIMENTS

First Embodiment

Figure 1:
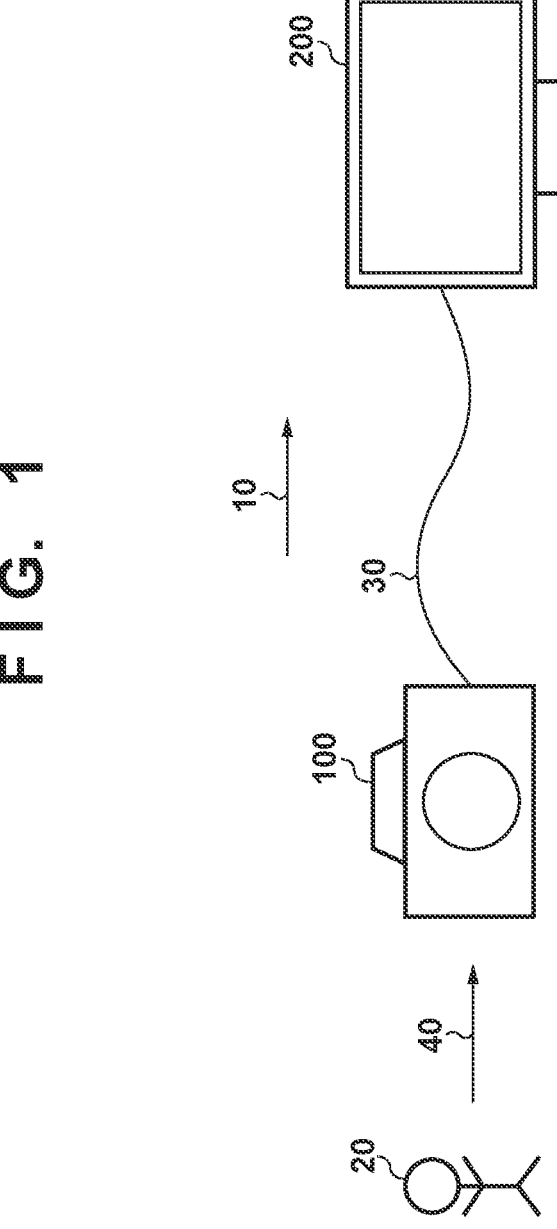
FIG. 1 is a diagram illustrating an example of a system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, a case where a digital camera is used as an example of an image processing apparatus will be described as an example. However, the present embodiment is applicable not only to a digital camera but also to devices capable of displaying information on an external display such as a mobile phone, a personal computer (laptop type, desktop type, tablet type, or the like), a game machine, and a wearable information terminal.

FIG. 1 illustrates a system for displaying an image on a display 200, as an example of an external display, using the digital camera of the present embodiment. A digital camera 100 is connected to the display 200 by a cable 3 (or wirelessly). The digital camera 100 stores a captured image as an image file. Note that the image file may be, for example, a RAW file composed of information obtained by recording an optical signal acquired by an image sensor of the digital camera 100 and image capturing time information. The image file may be, for example, a JPEG file composed of image information converted into a JPEG scheme and shooting time information. Note that the image file may be another type of image file.

In the system illustrated in FIG. 1, the digital camera 100 receives from a user 20 an instruction 40 (hereinafter, a playback instruction) for displaying (playing back) an image file stored in the digital camera 100 on the display 200. Upon receiving the playback instruction 40, the digital camera 100 transmits to the display 200 a transmission signal 10 including image information and metadata generated from information of the image file, to thereby display the image in the digital camera 100 using the display 200.

Images that can be outputted to the display 200 include not only conventional SDR images but also HDR images which have an extended dynamic range that can be represented. In order to correctly display an HDR image on the display 200, it is necessary not only to simply increase a luminance but also to express "color" and "gradation" according to human visual properties. Therefore, in the present embodiment, in order to display SDR images and HDR images respectively, the digital camera 100 performs control to change input/output characteristics (gamma characteristics (also referred to as EOTF)) and the like of the display 200 in accordance with the image to be displayed. However, for example, when switching images to be displayed in a slideshow from an SDR image to an HDR image, the display of the display 200 is blacked out when the display setting of the display 200 is switched. Then, after the display setting of the display 200 is switched, an image transmitted from the digital camera 100 is displayed. Accordingly, in the present embodiment, the digital camera

100 controls transmission of the image to the display 200 by performing, for example, a display control process to be described later so that an image to be displayed is displayed for at least a desired time or longer.

(Example of Digital Camera Function Configuration)

Figure 2:
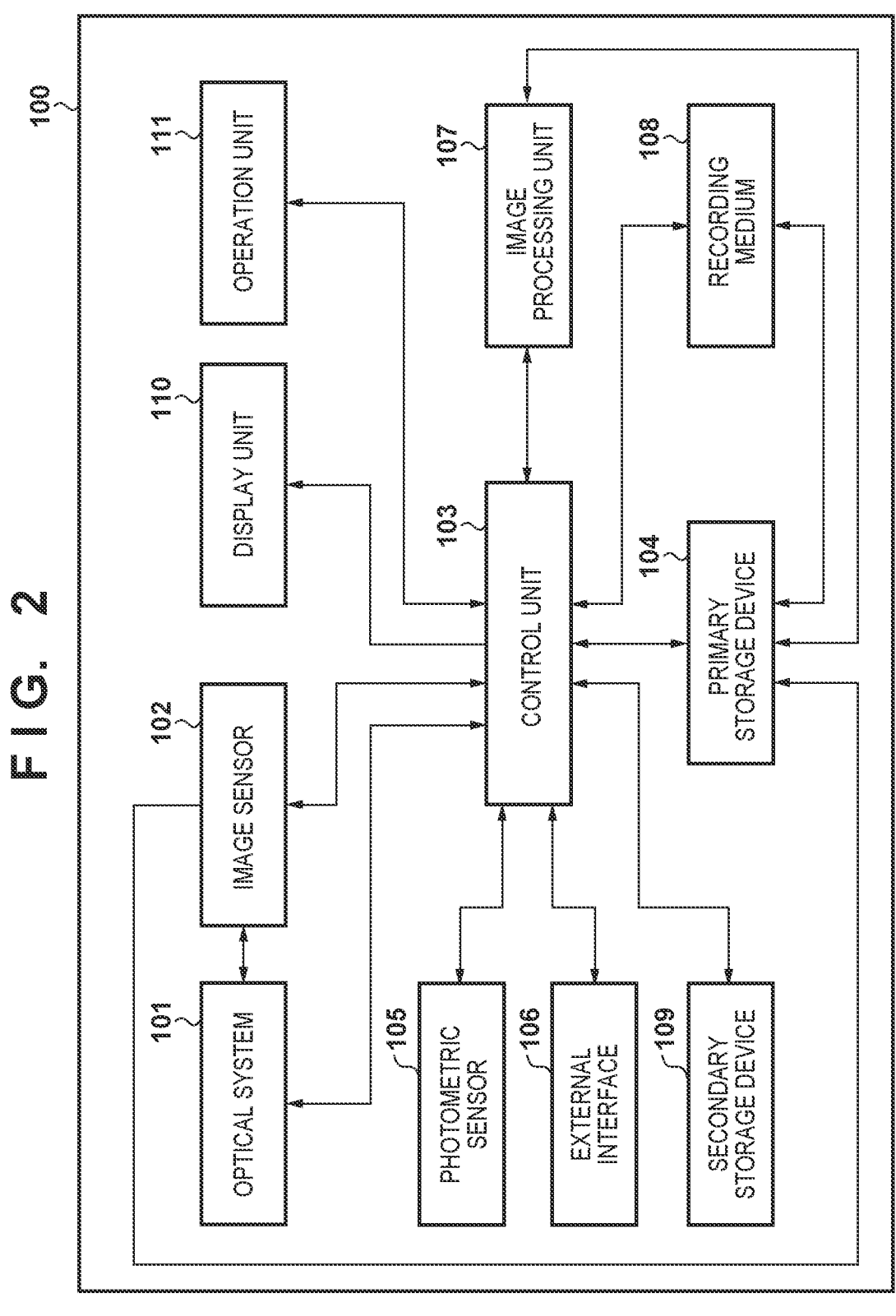
FIG. 2 is a block diagram illustrating an example of a functional configuration of a digital camera as an example of an image processing apparatus according to the first embodiment.

Next, a functional configuration example of a digital camera as an example of the image processing apparatus according to the present embodiment will be described with reference to FIG. 2.

An optical system 101 includes a lens, a shutter, and a diaphragm, and exposes an image sensor 102 with an optical image of a subject. Then, information such as the focal length, the shutter speed, and the aperture value is transmitted to a control unit 103.

The image sensor 102 may be, for example, a CCD image sensor or a CMOS image sensor configured by an RGB Bayer array, or the like. The image sensor 102 converts the optical image formed on the imaging surface by the optical system 101 into luminance information for each pixel, and outputs the luminance information as image information. The image information is digitized through an A/D converter (not illustrated), and the digitized data (so-called undeveloped RAW data) is stored in a primary storage device 104. Note that the electric gain of the image sensor 102 (hereinafter, ISO sensitivity) is set by the control unit 103.

The photometric sensor 105 is divided into a plurality of photometric regions (for example, a total of 96 photometric regions, 12 horizontally by 8 vertically), detects a subject luminance for each region from the amount of light that enters from the optical system 101, and transmits digitized data to the control unit 103 through an A/D converter (not illustrated). Note that the number of divisions may be any positive number, and is not limited to the example of the present embodiment.

The control unit 103 includes one or more processors. The control unit 103 reads a program stored in a secondary storage device into the primary storage device 104 and executes the program, to thereby control each unit constituting the digital camera 100 in accordance with an input signal or the like and realize the functions of the digital camera 100. Note that, in the following explanation, at least some of the functions realized by the control unit 103 executing the program may be realized by dedicated hardware such as an ASIC, or may be executed by another processor such as a GPU.

The primary storage device 104 is, for example, a volatile storage device such as a RAM, and is used to temporarily store, for example, calculation results of the control unit 103 and information of images. Further, the information stored in the primary storage device 104 may be used by an image processing unit 107 or recorded in a recording medium 108.

The secondary storage device 109 is, for example, a nonvolatile storage device such as an EEPROM, and stores programs (firmware) for controlling the digital camera 100 and various setting information. The program is used, for example, by the control unit 103.

The recording medium 108 records, for example, data of an image obtained by image capture and stored in the primary storage device 104. Note that the recording medium 108 can be removed from the digital camera 100 like a semiconductor memory card, for example, and data recorded thereon can be read by another device such as a personal computer. That is, the digital camera 100 has an attachment/detachment mechanism and a function for reading/writing the recording medium 108.

The image processing unit 107 performs, on the captured image data, so-called development processing such as white balance processing; color interpolation processing for converting a signal of a generally known RGB Bayer array into a three-plane RGB signal; gamma correction processing; color saturation correction; and hue correction. Further, the image processing unit 107 performs color gamut conversion and output range conversion according to an output destination when outputting an image to the outside. Note that some or all of the processing performed by the image processing unit 107 may be performed by the control unit 103.

A display unit 110 includes, for example, a liquid crystal panel or an organic EL panel, and displays a viewfinder image at the time of image capturing, a captured image, a GUI image for interactive operation, and the like. In the present embodiment, the playback time of the slideshow may be displayed at the time of an operation for displaying the slideshow. When a plurality of images are switched and displayed on the display 200, a reproduction time displayed on the display unit 110 may be the total time of the display times of the respective images (actual image display times) which do not include the time required for changing the display setting on the display. Further, the playback time may be the total time, for a plurality of images, of the time required for changing the display setting on the display 200 and the display times of the respective images. It is assumed that the display time corresponds to a length of time specified by the user for displaying a single image on the display 200. However, the length of time for displaying the image that the user designates is not limited to the length of time for displaying the image alone, and may be the total time for displaying a plurality of images; and is not limited to the above example as long as the display time of a single image can be set.

An operation unit 111 is a group of input devices that receives a user's operation and transmits input information to the control unit 103, and may be, for example, a device for inputting using voice, line of sight, or the like as well as of course buttons, levers, a touch panel, or the like. A user operation may be an operation for displaying image files held in the recording medium 108 in a slideshow on an externally connected display. An operation for displaying a slideshow on an externally connected display may include an operation for instructing selection of an image file to be displayed on the display among a plurality of image files and a display time.

An external interface 106 is configured by a terminal of a standard such as HDMI or the like and a control unit thereof, and transmits image information, confirms connection between the terminal and the connected device, acquires information of the connected device, and gives a control instruction in accordance with the standard.

(Example of Sending and Receiving Information Between a Digital Camera and a Display)

Figure 3:
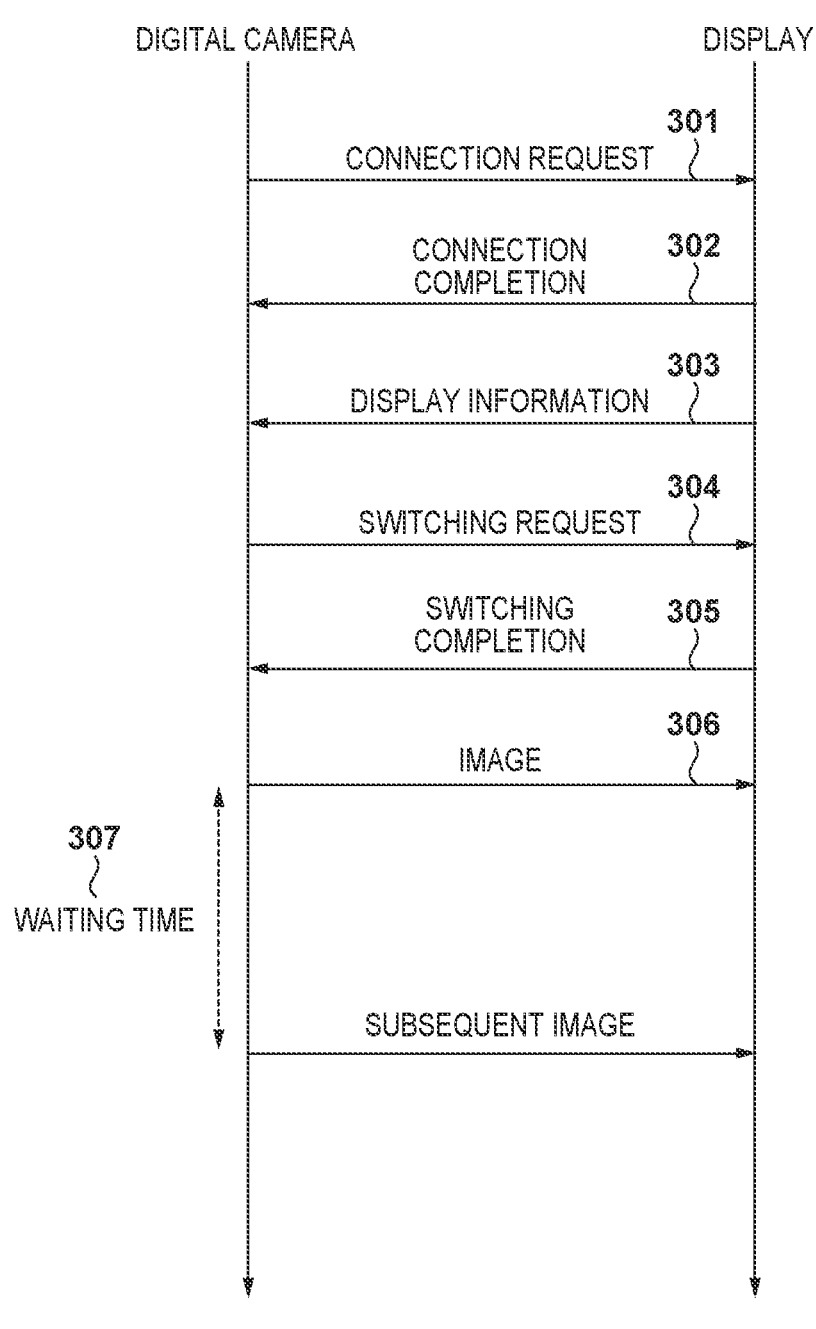
FIG. 3 is a diagram illustrating an example of transmission and reception of information between a digital camera and a display according to the first embodiment.

An example of transmission and reception of information between the digital camera 100 and the display 200 according to the present embodiment will be described with reference to FIG. 3. First, the digital camera 100 transmits a connection request 301 to the display 200. The connection request 301 is a request for establishing a connection for transmitting images between the digital camera 100 and the display 200 using a predetermined cable such as an HDMI cable. The digital camera 100 may perform a predetermined process for establishing a connection with the display 200. The digital camera 100 receives, from the display 200, a notification of connection completion 302 indicating completion of the connection.

Thereafter, the digital camera 100 receives, from the display 200, display information indicating information of the display setting of the display 200. The display information includes, as illustrated in FIG. 4, information on a gamma characteristic (electro-optical transfer function (EOTF)) set on the display 200 (also simply referred to as gamma information) and information on an output range (tone range) set on the display 200 as illustrated in FIG. 5. By receiving the display information, the digital camera 100 can confirm the consistency between the image to be transmitted to the display 200 and the gamma information and output range (tone range) of the received display information. In other words, the digital camera 100 can determine whether a characteristic of an image to be displayed on the display 200 corresponds to the display setting of the display 200.

FIG. 4 indicates whether the display is to be switched on the display 200 when the gamma information for displaying an image is SDR, HLG or PQ with respect to the gamma information set on the display 200. For example, the digital camera 100 can determine that a characteristic (gamma characteristic) of an image to be displayed on the display 200 and the gamma characteristic set on the display 200 are both SDR (γ2.2), and that the two gamma characteristics correspond to each other (match). Therefore, the digital camera 100 can determine that switching of the display 200 is unnecessary. When the gamma characteristic of the image to be displayed is HLG (Hybrid Log Gamma) and the gamma characteristic indicated by the display information is PQ (Perceptual Quantization), the digital camera 100 can determine that the gamma characteristics of the image to be displayed and the gamma characteristic set in the display 200 do not correspond (do not match). In this case, the digital camera 100 can determine that the display setting of the display 200 must be switched in order to display the image with the HLG gamma characteristic on the display 200. Note that, in the above example, the SDR standard is given as γ2.2 as an example, but the SDR standard may be sRGB, which is known, or the like.

For output range information illustrated in FIG. 5, similarly to the gamma information, in a case where a characteristic (output range) of an image to be displayed and a display setting (output range) of the display 200 do not match, the digital camera 100 can determine that the two do not correspond to each other (do not match). When the characteristic (output range) of the image to be displayed does not match the display setting (output range) of the display 200, the digital camera 100 switches the display setting of the display 200 so that the display setting of the display 200 corresponds to the characteristic of the image.

Referring again to FIG. 3, the digital camera 100 transmits a switching request 304 (when changing the display setting of the display 200). The display 200 switches the display setting according to the switching request 304, and when the switching is completed, transmits a notification of a switching completion 305 to the digital camera 100.

Upon receiving the notification of the switching completion 305, the digital camera 100 transmits an image 306 to be displayed to the display 200. The image transmitted to the display 200 is, for example, an image file of the recording medium 108 designated by the operation unit 111 or image signal data acquired from the primary storage device 104. After the image 306 is transmitted, the image 306 is displayed for the display time specified by the user. If there is an image to be displayed next after a waiting time 307 corresponding to the designated display time has elapsed, the digital camera 100 performs processing for displaying the next image (from the acquisition of display information 303 to transmission of the image 306) and causes the display 200 to display the next image.

(A Series of Operations Related to Display Control Processing in a Digital Camera)

Figure 6:
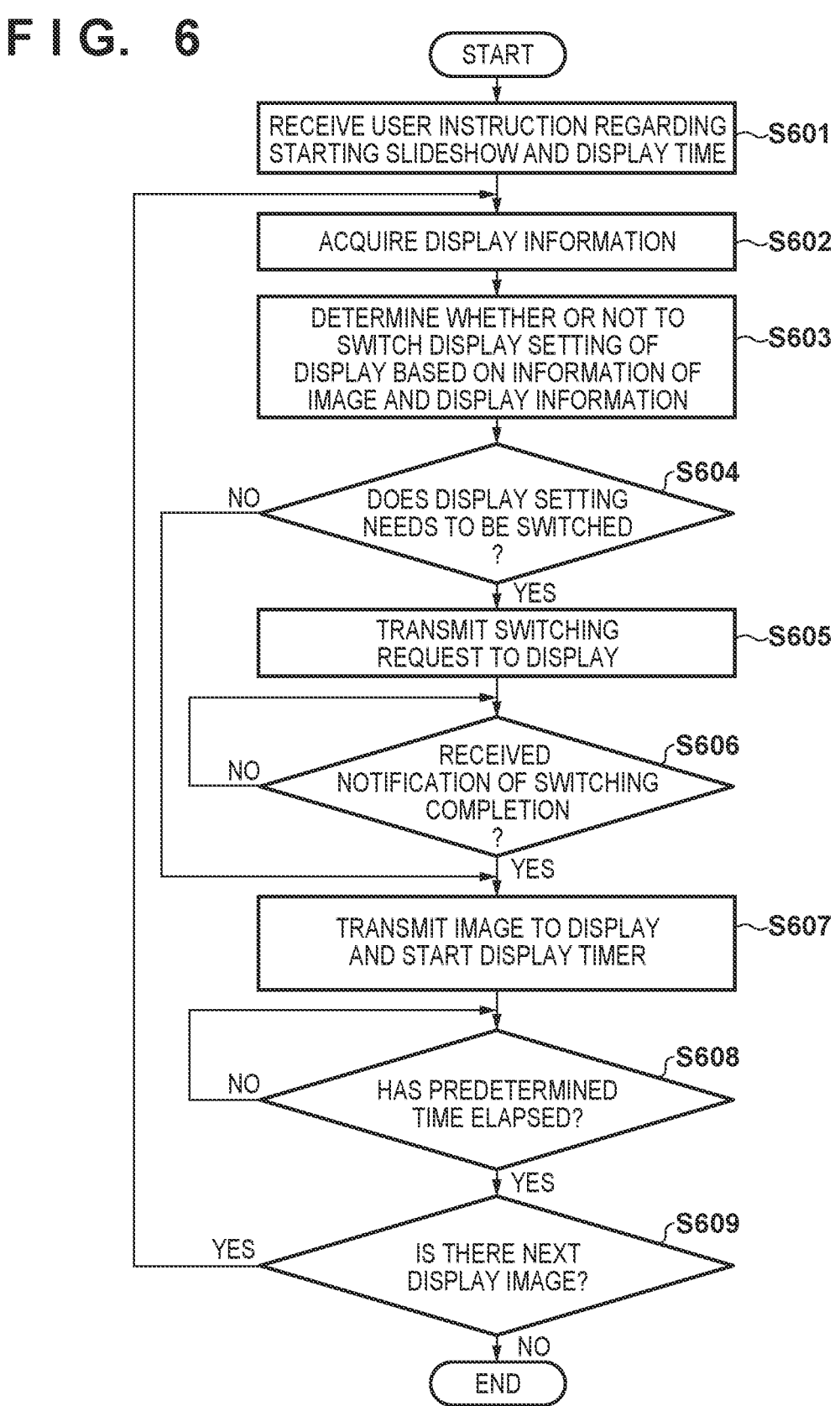
FIG. 6 is a flowchart illustrating a series of operations of a display control process in a digital camera according to the first embodiment.

Next, a series of operations related to the display control processing in the digital camera 100 will be described with reference to FIG. 6. Note that this process is realized by, for example, the control unit 103 of the digital camera 100 reading a program stored in the secondary storage device into the primary storage device 104 and executing the program.

In step S601, the control unit 103 receives a user instruction regarding starting the slideshow and a display time of the slideshow via the operation unit 111. For example, the control unit 103 sets the display time as a time corresponding to the length of a display of a single image in accordance with a user instruction.

In step S602, the control unit 103 acquires the above-described display information 303 (i.e., display setting information) from the display 200 via the external interface 106. Note that the control unit 103 may transmit a request for display information to the display 200 in order to acquire the display information 303.

In step S603, the control unit 103 determines whether or not the display setting of the display 200 needs to be switched based on a characteristic of an image to be displayed on the display 200 and the display information. The determination as to whether or not the display setting of the display 200 needs to be switched is as described with reference to FIG. 3.

In step S604, the control unit 103 advances the processing to step S605 when it is determined in step S603 that the display setting needs to be switched, and advances the processing to step S607 otherwise. In step S605, the control unit 103 transmits the switching request 304 to the display 200 via the external interface 106.

In step S606, the control unit 103 determines whether or not a notification of the switching completion 305 has been received from the display 200; in a case where the notification of the switching completion 305 has been received, the process proceeds to step S607, otherwise, the process of step S606 is executed again. That is, the control unit 103 can confirm that the change of the display setting on the display 200 has been completed by receiving the notification of the switching completion 305, and start the transmission of an image to be displayed in response to the completion of the change of the display setting.

Meanwhile, when in step S603 it is found to be not necessary to switch the display setting (for example, a case where the display setting of the display 200 of the image to be displayed first corresponds to the characteristic of the image to be displayed next), the display setting of the display 200 is not changed. In this case, the control unit 103, by advancing the process to step S607, can control the image transmission so that a single image is displayed on the display 200 for the display time without changing the display setting of the display 200.

In step S607, the control unit 103 transmits the image to the display 200 and starts a display timer. The display timer is a timer for controlling a single image to be displayed on the display 200 for the display time. In step S608, the control unit 103 determines whether a predetermined time (display time in the present embodiment) has elapsed since the start of the display timer. If it is determined that the predetermined time has elapsed, the control unit 103 advances the process to step S609, and otherwise the control unit 103 repeats the step S608 process.

In step S609, the control unit 103 determines whether there is an image to be displayed next on the display 200 (a subsequent display image). The control unit 103 returns the process to step S602 when it is determined that there is a subsequent image for the slideshow, and ends the series of processes otherwise. As described above, the control unit 103 performs the processes from step S602 to step S605 so as to display the subsequent image on the display 200 in response to the display timer having passed the display time. By doing so, it is possible to control the image transmission such that a single image is displayed on the display 200 for the display time after the change of the display setting on the display 200 is completed.

As described above, in the present embodiment, when the display setting of the display 200 and the characteristic of the image displayed on the display 200 do not correspond to each other, the control unit 103 changes the display setting of the display 200 so that the display setting and the characteristic of the image correspond to each other. In a case where the display setting of the display 200 is changed, the control unit 103 controls image transmission so that a single image is displayed on the display 200 for the display time in response to completion of the change of the display setting on the display 200.

By doing this, it becomes possible to display an image for an appropriate display time when switching a display setting for displaying an image in a display.

In the above-described embodiment, when determining whether or not to switch the display setting, the display information (display setting of the display) is acquired, and it is determined whether the display setting corresponds to the characteristic of the image to be displayed. However, once the display information (display setting of the display) is acquired, it may be determined whether or not the characteristic of the previously displayed image and the characteristic of the image to be displayed are the same (or different).

Second Embodiment

In the first embodiment, an example is given in which an image is displayed for a specified display time when the display setting of the display 200 is switched. Although the image display guarantees the specified display time, the interval at which the images are displayed is variable depending on the switching time of the display setting. In the second embodiment, an example is given in which an image is displayed for at least a specified display time and the interval at which the images are displayed is fixed. Note that the configuration of the system and the digital camera 100 in the second embodiment may be the same as in the first embodiment. Therefore, the same components or processes as those in the first embodiment are denoted by the same reference numerals, and the description thereof will be omitted.

(Example of Sending and Receiving Information Between a Digital Camera and a Display)

Figure 7:
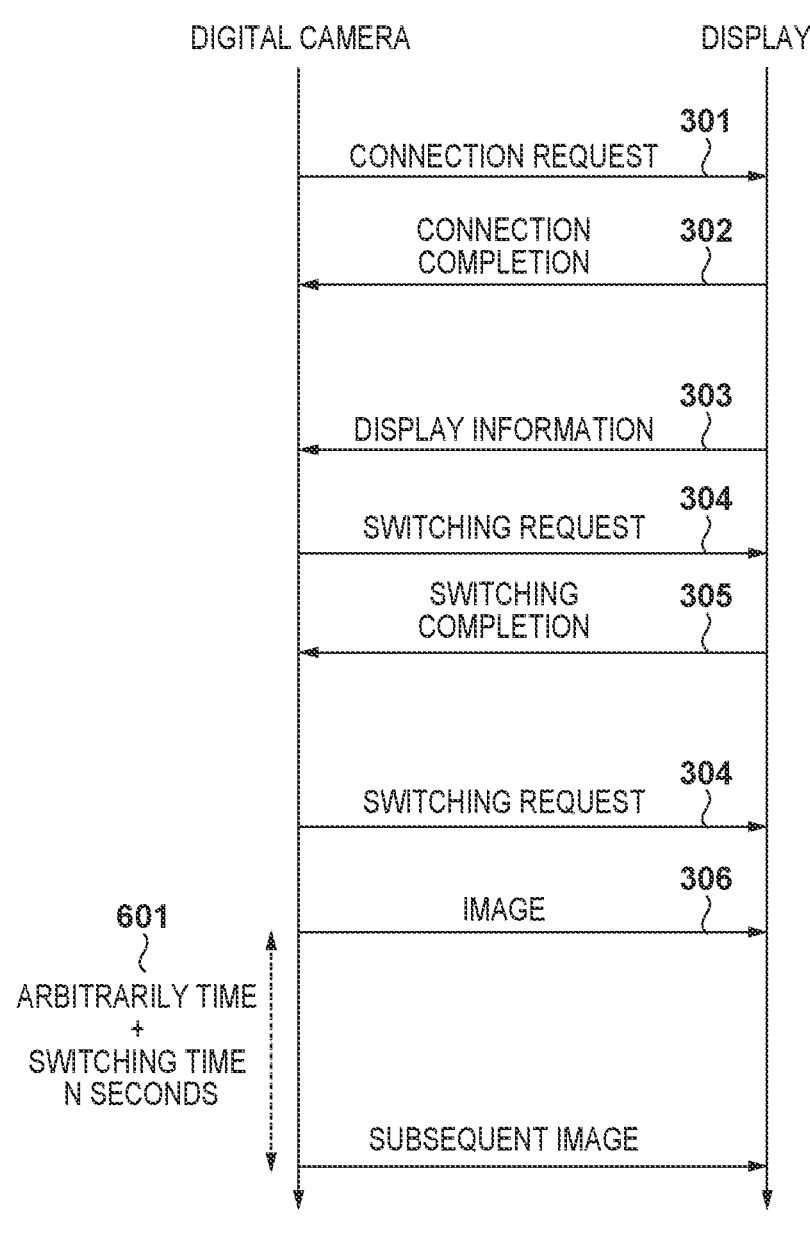
FIG. 7 is a diagram illustrating an example of transmission and reception of information between a digital camera and a display according to a second embodiment.

An example of transmission and reception of information between the digital camera 100 and the display 200 according to the present embodiment will be described with reference to FIG. 7.

As in the first embodiment, the digital camera 100 transmits the connection request 301 to the display 200, receives a notification of the connection completion 302, and completes the connection. Next, the digital camera 100 measures the longest time (waiting time N) required to switch the display setting by actually performing the switching of the display setting with respect to the patterns in which the switching of the display setting may occur. Specifically, the digital camera 100 first acquires the display information 303 from the display 200. The digital camera 100 repeats the transmission of the switching request 304 and the reception of the switching completion 305 by the number of patterns in which switching of display settings can occur between the digital camera 100 and the display 200. While the transmission of the switching request 304 and the reception of the switching completion 305 are repeated, a time period in which the time required for switching is the longest is stored in the primary storage device 104 as the waiting time N.

Note that, in the present embodiment, the waiting time N is the longest time for switching of the display setting occurring between the devices, but the waiting time N may be set to another time. For example, the longest display setting switching time among a plurality of images to be displayed on the display 200 may be set to the waiting time N. Alternatively, a plurality of display setting switching times of the display 200 may be measured in advance, and stored as the waiting time N in the secondary storage device 109 as design values. The conditions under which the display setting is switched are similar to those in the first embodiment, but a method of converting an image to be displayed in order to suppress the switching of the display 200, which will be described later with reference to FIG. 9 and FIG. 10, may be taken into consideration.

The digital camera 100 calculates the waiting time N for switching the display settings, and then checks the characteristics of the image to be transmitted to the display 200, for example, for a slideshow. The digital camera 100 may transmit the image 306 to the display 200 without transmitting the switching request 304 when it is determined that the characteristic (that is, the gamma information and the output range (tone range)) of the previously displayed image and the characteristic of the image to be displayed next match. When, for example, the digital camera 100 determines that the characteristic of the image displayed first does not match the characteristic of the image displayed next, it transmits the switching request 304 to the display 200 and also transmits the image 306. After transmitting the image 306, the digital camera 100 displays the image for a time 601 obtained by adding the waiting time N to the display time specified by the user. For example, if the waiting time N is 3 seconds, and the display setting switch on the display 200 takes 2 seconds, and the display time is designated as 3 seconds, then the image is displayed for 4 seconds after the switching of 2 seconds. After the time 601 has elapsed, if there is an image to be displayed next, the digital camera 100 again repeats the processing from the process of confirming the characteristic of the image to be transmitted to the display 200 to the process of transmitting the image 306. As described above, in the present embodiment, by adding the waiting time N to the designated display time (while displaying the image at least for the display time), it is possible to switch the image display at regular intervals.

(A Series of Operations Related to Display Control Processing in a Digital Camera)

Next, a series of operations related to the display control processing in the digital camera 100 according to the present embodiment will be described with reference to FIG. 8. Note that this process is realized by, for example, the control unit 103 of the digital camera 100 reading a program stored in the secondary storage device into the primary storage device 104 and executing the program.

In step S801, the control unit 103 acquires the above-described display information 303 (i.e., display setting information) from the display 200 via the external interface 106. Note that the control unit 103 may transmit a request for display information to the display 200 in order to acquire the display information 303.

In step S802, the control unit 103 sets one of the patterns for switching the display setting of the display 200. In step S803, the control unit 103 transmits the switching request 304 to the display 200 so as to set the display setting of the display 200 to the pattern set in step S802.

In step S804, the control unit 103 determines whether or not a notification of the switching completion 305 has been received from the display 200; in a case where the notification of the switching completion 305 has been received, the process proceeds to step S805, otherwise, the process of step S804 is executed again.

In step S805, the control unit 103 measures the time required for switching the display setting, and stores the time in the primary storage device 104 if the measurement time is the longest.

In step S806, the control unit 103 determines whether or not all patterns for switching the display setting of the display 200 have been executed, and when it is determined that all patterns have been executed, the process proceeds to step S807, and otherwise, the process returns to step S801. When the process proceeds to step S807, the measurement time stored in the primary storage device 104 is the longest time (that is, the waiting time N) for switching the display setting.

In step S807, the control unit 103 transmits an image to the display 200 after the switching request 304 corresponding to the image to be displayed is transmitted to the display 200, and starts a display timer. At this time, the total time of the display time specified by the user and the waiting time N is set as a second predetermined time used for the determination of the display timer. Although the description of the display control process in the present embodiment has been omitted in order to simplify the flowchart, step S602 and step S603 described in the first embodiment may be performed prior to executing step S807 to determine whether or not the display setting of the display 200 needs to be switched. In step S808, the control unit 103 determines whether the second predetermined time has elapsed since the switching request 304 was transmitted to the display 200. If it is determined that the second predetermined time has elapsed, the control unit 103 advances the process to step S809, and otherwise repeats execution of the step S808 process.

In step S809, the control unit 103 determines whether there is an image to be displayed next on the display 200 (a subsequent display image). The control unit 103 returns the process to step S807 when it is determined that there is a subsequent image for the slideshow, and ends the series of processes otherwise. As described above, the control unit 103 performs the processes from step S807 to step S808 so as to display the subsequent image on the display 200 in response to the display timer having passed the total time of the display time and the waiting time N. In this way, even if the display setting change time in the display 200 is different, the transmission of the image can be controlled so that a single image is displayed on the display 200 for at least the display time after the change of the display setting is completed. Then, the image display can be switched at regular intervals.

As described above, in the present embodiment, in a case where the display setting of the display 200 and the characteristic of the image displayed on the display 200 do not correspond to each other, the control unit 103 changes the display setting of the display 200 so that the display setting and the characteristic of the image correspond to each other. Then, when the display setting of the display 200 is changed, the control unit 103 controls image transmission such that a single image is displayed on the display 200 for at least the display time after the change of the display setting is completed according to the total time of the display time and the waiting time N. By doing this, it becomes possible to display an image for an appropriate display time when switching a display setting for displaying an image in a display.

In the condition for determining the switching of the display setting described above, as illustrated in FIG. 9 and FIG. 10, the conversion of the characteristic of the image may be considered. That is, the control unit 103 may convert the characteristic of the image to be transmitted to the display 200 in accordance with the display setting of the display 200 and the characteristic (gamma characteristic or tone range) of the image to be transmitted.

For example, when converting the gamma characteristic, if the gamma characteristic of the display 200 is SDR and the characteristic of the image to be transmitted is HLG, the control unit 103 can perform a conversion into SDR, which does not cause the display to be switched, on the image. In addition, the control unit 103 can also select not to convert the image, and can switch the display setting of the display 200 as in the first embodiment. The characteristic of HLG is a hybrid of Rec709 and LOG, which are displayed compressed near saturation, but HLG can be expressed as equivalent to SDR in appropriate regions. Therefore, the control unit 103 may display an image without converting a characteristic of the image to be displayed, and may display an image compressed near saturation by conversion into SDR. When the gamma characteristic of the image to be displayed is PQ, the dynamic range is wider than that of SDR and the tone can be maintained in the conversion. For this reason, the control unit 103 may convert the characteristic of the image to be displayed into SDR to suppress switching of the display setting of the display 200.

In a case where the gamma characteristic in the display setting of the display 200 is HLG and the characteristic of the image to be transmitted is SDR, HLG can represent the wider dynamic range. Meanwhile, since it is possible to perform the conversion while maintaining the tone with the HLG characteristic, the control unit 103 may suppress the switching of the display setting of the display 200 by conversion into HLG. When the characteristic of the image to be transmitted is PQ, PQ gamma assigns more to the darker tone side than HLG gamma, and thus conversion that maintains the tone is possible. However, the maximum luminance that can generally be expressed in HLG is 1000 nit and is 10000 nit in PQ. For this reason, a conversion into HLG is performed below the maximum luminance of HLG, and in other cases, the display setting of the display may be switched (since the other cases are difficult to express in HLG) for the displaying.

When the gamma characteristic in the display setting of the display 200 is PQ, it is difficult to express the intended image by the method of converting and displaying the image to be transmitted in accordance with the display 200. Therefore, when the gamma characteristic in the display setting is PQ and the image to be transmitted is not PQ, the control unit 103 switches the display setting of the display 200 and then displays the image.

The range conversion illustrated in FIG. 9 indicates a combination of the input range of the display 200 and the range of the image to be transmitted. The control unit 103 switches the display setting in a case where the input range (tone range) of the display setting on the display 200 is wider than the range of the image to be displayed, and converts the range of the image to be transmitted in a case where the input range is narrower than the range of the image to be displayed.

In the present embodiment, the number of times of the display setting of the display 200 is switched is reduced by the conversion from HLG to SDR, but the switching of the display may be skipped according to other factors.

For example, from the viewpoint of dynamic range, if the maximum luminance of a PQ image to be transmitted is larger than the maximum luminance when the display setting of the display is PQ, a slight amount of clipping of the image may be allowed as long as the maximum luminance is within an arbitrary threshold. Also, configuration may also be taken such that the display setting of the display 200 is not switched. In addition, from the viewpoint of color gamut, configuration may also be taken such that the display setting of the display is not switched in a case where the width of the color gamut and the conversion coefficient are close to each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-186608, filed Nov. 22, 2022 which is hereby incorporated by reference herein in its entirety.

What is claimed is:

1. An image processing apparatus, comprising:
an interface configured to transmit an image that a display is to be caused to display;
one or more processors; and
a memory storing instructions which, when the instructions are executed by the one or more processors, cause the image processing apparatus to function as:
a setting unit configured to set a display time corresponding to a length of time that the display is to be caused to display a single image;
an acquiring unit configured to acquire a display setting of the display via the interface;
a first control unit configured to control whether or not to request a change of a display setting of the display according to a correspondence between the display settings of the display and a characteristic of the image; and
a second control unit configured to control image transmission to the display via the interface so that a single image is displayed on the display for at least the display time,
wherein the second control unit, in a case where the first control unit requests a change of a display setting of the display, transmits the image after the change to the display setting in the display is completed.

2. The image processing apparatus of claim 1,
wherein the first control unit further, in a case where a characteristic of a first image that has been displayed in the display and a characteristic of a second image that the display is to be caused to display next differ, configured to request the change of the display setting of the display via the interface so that the display setting of the display and the characteristic of the second image that the display is to be caused to display correspond.

3. The image processing apparatus of claim 1,
wherein the first control unit further, in a case where the display setting of the display when a first image has been displayed and a characteristic of a second image that the display is to be caused to display next do not correspond, configured to request the change of the display setting of the display via the interface so that the display setting of the display and the characteristic of the second image that the display is to be caused to display correspond.

4. The image processing apparatus of claim 1,
wherein the first control unit further, in a case where a characteristic of a first image that has been displayed in the display and a characteristic of a second image that the display is to be caused to display next are the same, configured not to request the change of the display setting of the display,
wherein the second control unit further configured to transmit the image so that a single image is displayed on the display for the display time.

5. The image processing apparatus of claim 1,
wherein the second control unit further, in a case where the display setting of the display when a first image has been displayed and a characteristic of a second image that is to be caused to be displayed in the display next correspond, configured to transmit the image so that a single image is displayed on the display for the display time without changing the display setting of the display.

6. The image processing apparatus of claim 1,
wherein in a case where the first control unit requests the changes of the display setting of the display, the second control unit transmits the image so that a single image is displayed on the display for the display time in response to a notification indicating that the change to the display setting in the display has been completed being received via the interface.

7. The image processing apparatus of claim 1,
wherein in a case where the first control unit requests the change of the display setting of the display, the second control unit transmits the image so that a total of the longest time required for changing the display setting in the display and the display time becomes fixed.

8. The image processing apparatus of claim 1,
wherein the second control unit further acquires, from the display, information indicating the display setting of the display via the interface.

9. The image processing apparatus of claim 1, further comprising
a display unit configured to, in a case where a plurality of images are displayed on the display switched by the second control unit, display as a playback time either a total time of display times of respective images not including a time required for changing the display setting in the display or a total time of a time required for changing the display setting in the display and the display time for the plurality of images.

10. The image processing apparatus of claim 1, further comprising
a conversion unit configured to convert a characteristic of the image to be transmitted to the display according to the display setting of the display and the characteristic of the image to be transmitted to the display.

11. The image processing apparatus of claim 10,
wherein the second control unit, in a case where the characteristic of the image to be transmitted to the display has been converted by the conversion unit, controls transmits the image such that the converted image is displayed on the display for the display time without changing the display setting of the display.

12. The image processing apparatus of claim 1, wherein the characteristic of an image includes a gamma characteristic and an output range.

13. The image processing apparatus of claim 1, further comprising a determination unit configured to determine whether or not a change of the display setting of the display is necessary based on a characteristic of an image to be caused to be displayed on the display and information of the display setting of the display.

14. The image processing apparatus of claim 1, wherein the second control unit transmits the image to the display and determines whether or not the display time has elapsed since the start of the transmission.

15. The image processing apparatus of claim 1, wherein the display setting of the display includes an electro-optical transfer function set in the display and information of a tone range.

16. A method of controlling an image processing apparatus with an interface for transmitting an image that a display is to be caused to display, the method comprising:
setting a display time corresponding to a length of time that the display is to be caused to display a single image;
acquiring a display setting of the display via the interface;
controlling whether or not to request a change of a display setting of the display according to a correspondence between the display settings of the display and a characteristic of the image; and controlling image transmission to the display via the interface so that a single image is displayed on the display for at least the display time, wherein the control includes, in a case where a change of a display setting of the display is requested, transmitting the image after the change to the display setting in the display is completed.

17. A non-transitory computer-readable storage medium comprising instructions for performing a method of controlling an image processing apparatus with an interface for transmitting an image that a display is to be caused to display, the method comprising:

setting a display time corresponding to a length of time that the display is to be caused to display a single image;

acquiring a display setting of the display via the interface;

controlling whether or not to request a change of a display setting of the display according to a correspondence between the display settings of the display and a characteristic of the image; and controlling image transmission to the display via the interface so that a single image is displayed on the display for at least the display time, wherein the control includes, in a case where a change of a display setting of the display is requested, transmitting the image after the change to the display setting in the display is completed.

\* \* \* \* \*